(12) United States Patent
Gkinosatis

(10) Patent No.: US 8,697,211 B2
(45) Date of Patent: Apr. 15, 2014

(54) STACK SEALABLE HEAT SHRINKABLE FILM

(75) Inventor: Dimitris Gkinosatis, Koropi Attica (GR)

(73) Assignee: Flexopack S.A. Plastics Industry, Koropi-Attiki (GR)

( * ) Notice: Subject to any disclaimer, the term of this patent is extended or adjusted under 35 U.S.C. 154(b) by 579 days.

(21) Appl. No.: 12/150,168

(22) Filed: Apr. 25, 2008

(65) Prior Publication Data

US 2008/0274314 A1 Nov. 6, 2008

(30) Foreign Application Priority Data

Apr. 26, 2007 (EP) .................................... 07107035

(51) Int. Cl.
*B65B 53/02* (2006.01)
*B65B 55/00* (2006.01)

(52) U.S. Cl.
USPC .......................................... 428/35.9; 426/415

(58) Field of Classification Search
USPC .................. 428/34.9, 483; 426/415
See application file for complete search history.

(56) References Cited

U.S. PATENT DOCUMENTS

| | | | |
|---|---|---|---|
| 3,299,194 A | 1/1967 | Golike | |
| 3,356,192 A | 12/1967 | Cameron | |
| 3,456,044 A | 7/1969 | Pahlke | |
| 3,536,192 A | 10/1970 | Couper | |
| 3,956,229 A | 5/1976 | Bollen et al. | |
| 4,064,296 A | 12/1977 | Bornstein et al. | |
| 4,254,869 A | 3/1981 | Heier | |
| 4,399,181 A | 8/1983 | Yoshimura et al. | |
| 4,612,221 A | 9/1986 | Biel et al. | |
| 4,650,721 A | 3/1987 | Ashcraft et al. | |
| 4,786,561 A | 11/1988 | Fong | |
| 4,801,486 A * | 1/1989 | Quacquarella et al. | 428/34.9 |
| 4,863,769 A | 9/1989 | Lustig et al. | |
| 4,869,049 A | 9/1989 | Richards et al. | |
| 4,912,149 A | 3/1990 | Robeson et al. | |
| 4,934,529 A | 6/1990 | Richards et al. | |
| 4,976,898 A | 12/1990 | Lustig et al. | |
| 4,977,022 A | 12/1990 | Mueller | |
| 4,990,562 A | 2/1991 | Chou et al. | |
| 5,034,281 A * | 7/1991 | Kawasaki et al. | 428/522 |
| 5,079,051 A | 1/1992 | Garland et al. | |
| 5,179,168 A | 1/1993 | Hirasawa | |
| 5,256,351 A * | 10/1993 | Lustig et al. | 264/470 |
| 5,256,428 A | 10/1993 | Lustig et al. | |
| 5,298,202 A | 3/1994 | Schirmer | |
| 5,302,402 A | 4/1994 | Dudenhoeffer et al. | |
| 5,397,613 A | 3/1995 | Georgelos | |
| 5,562,958 A | 10/1996 | Walton et al. | |
| 5,593,747 A | 1/1997 | Georgelos | |
| 5,645,788 A | 7/1997 | Bekele | |
| 5,698,279 A | 12/1997 | Vicik | |
| 5,834,077 A | 11/1998 | Babrowicz | |
| 5,837,335 A | 11/1998 | Babrowicz | |
| 5,851,610 A | 12/1998 | Ristey et al. | |
| 6,013,378 A | 1/2000 | White et al. | |
| 6,074,715 A | 6/2000 | Lind et al. | |
| 6,146,726 A | 11/2000 | Yoshii et al. | |
| 6,221,410 B1 | 4/2001 | Ramesh et al. | |
| 6,274,246 B1 | 8/2001 | Eggers et al. | |
| 6,346,285 B1 | 2/2002 | Ramesh | |
| 6,406,763 B1 | 6/2002 | Wolf et al. | |
| 6,458,437 B1 * | 10/2002 | Ito et al. | 428/35.1 |
| 6,506,463 B1 | 1/2003 | Cahill et al. | |
| 6,514,583 B1 | 2/2003 | Ahlgren et al. | |
| 6,516,588 B2 | 2/2003 | Jensen et al. | |
| 6,534,137 B1 | 3/2003 | Vadhar | |
| 6,572,959 B1 | 6/2003 | Buongiorno et al. | |
| 6,592,975 B1 | 7/2003 | Ueyama et al. | |
| 6,663,905 B1 | 12/2003 | Ennis et al. | |
| 6,682,792 B2 | 1/2004 | Schmal et al. | |
| 6,960,635 B2 | 11/2005 | Stevens et al. | |
| 7,473,473 B2 | 1/2009 | Verrocchi | |
| 7,611,770 B2 | 11/2009 | Kennedy et al. | |
| 7,736,726 B2 | 6/2010 | McAllister et al. | |
| 8,129,006 B2 | 3/2012 | Ginossatis | |

(Continued)

FOREIGN PATENT DOCUMENTS

| | | |
|---|---|---|
| AU | 511 195 B2 | 7/1980 |
| EP | 0 005 660 | 11/1979 |

(Continued)

OTHER PUBLICATIONS

Annonymous, "Advantages of metallocene ethylene [olymer resins in multilayer stretch films," Research Disclosure, Mason Publications, Hampshire, GB. vol. 419, No. 26 (1999).

(Continued)

*Primary Examiner* — Erik Kashnikow
(74) *Attorney, Agent, or Firm* — Jenkins, Wilson, Taylor & Hunt, P.A.

(57) ABSTRACT

A heat shrinkable film having a shrinkage of at least 10% measured according to ASTM 2732 in water at 90° C. in a least one of MD and TD directions, where the film comprises an outer layer comprising polyester elastomer and a core layer comprising EVOH and/or PVDC. The film can be characterized by a combination of desirable properties, such as high shrinkage, good optical properties, excellent sealability and stack sealability. A method of producing a packaged food item by using a heat shrinkable film is provided. The use of a heat shrinkable film or bags and pouches made therefrom for packaging goods, for example, food products, is also provided.

7 Claims, No Drawings

(56) References Cited

U.S. PATENT DOCUMENTS

| | | | |
|---|---|---|---|
| 2002/0119334 A1 | 8/2002 | Shepard et al. | |
| 2002/0172834 A1 | 11/2002 | Rivett et al. | |
| 2003/0012900 A1 | 1/2003 | Wolf et al. | |
| 2003/0073785 A1 | 4/2003 | Okada et al. | |
| 2003/0213804 A1 | 11/2003 | Chomik et al. | |
| 2003/0218022 A1 | 11/2003 | Chomik et al. | |
| 2004/0065052 A1 | 4/2004 | Ramesh et al. | |
| 2004/0157077 A1 | 8/2004 | Roussos | |
| 2005/0064123 A1 | 3/2005 | Chomik et al. | |
| 2005/0129811 A1 | 6/2005 | Kraimer et al. | |
| 2005/0147778 A1* | 7/2005 | Tai et al. | 428/36.91 |
| 2005/0191439 A1 | 9/2005 | Hirose et al. | |
| 2005/0271877 A1 | 12/2005 | Ginossatis | |
| 2006/0177616 A1 | 8/2006 | Barber et al. | |
| 2006/0177641 A1 | 8/2006 | Breese et al. | |
| 2006/0199030 A1 | 9/2006 | Liang et al. | |
| 2006/0199912 A1 | 9/2006 | Fuchs et al. | |
| 2006/0272767 A1 | 12/2006 | Kreitman et al. | |
| 2006/0286323 A1 | 12/2006 | Siegel et al. | |
| 2007/0042089 A1 | 2/2007 | Grah | |
| 2007/0082150 A1 | 4/2007 | Ginossatis | |
| 2008/0003332 A1 | 1/2008 | Ginossatis | |
| 2008/0070047 A1 | 3/2008 | Rehkugler et al. | |
| 2008/0095960 A1 | 4/2008 | Schell et al. | |
| 2008/0115463 A1 | 5/2008 | Wilson | |
| 2008/0255311 A1 | 10/2008 | Chang et al. | |
| 2008/0274328 A1 | 11/2008 | Gkinosatis | |
| 2008/0305220 A1 | 12/2008 | Gkinosatis | |
| 2009/0176117 A1 | 7/2009 | Gkinosatis | |
| 2009/0191392 A1 | 7/2009 | Gkinosatis | |
| 2009/0196962 A1 | 8/2009 | Gkinosatis | |
| 2009/0240227 A1 | 9/2009 | Toro et al. | |
| 2009/0263599 A1 | 10/2009 | Gkinosatis | |
| 2010/0028574 A1 | 2/2010 | Gkinosatis | |
| 2010/0034939 A1 | 2/2010 | Gkinosatis | |
| 2011/0159263 A1 | 6/2011 | Gkinosatis | |
| 2012/0279181 A1 | 11/2012 | Gkinosatis | |
| 2013/0019568 A1 | 1/2013 | Gkinosatis | |
| 2013/0209797 A1 | 8/2013 | Gkinosatis | |
| 2013/0227916 A1 | 9/2013 | Gkinosatis | |

FOREIGN PATENT DOCUMENTS

| | | |
|---|---|---|
| EP | 0 286 407 | 10/1988 |
| EP | 0 402 043 | 12/1990 |
| EP | 0 472 418 | 2/1992 |
| EP | 0 627 465 | 12/1994 |
| EP | 0810087 | 12/1997 |
| EP | 1 072 632 A2 | 1/2001 |
| EP | 0 930 349 B1 | 6/2003 |
| EP | 1060077 | 6/2003 |
| EP | 1415930 | 5/2004 |
| EP | 1131205 | 12/2004 |
| EP | 1 514 680 A1 | 3/2005 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| GB | 1 140 765 | 1/1969 |
| GB | 2 236 531 | 4/1991 |
| JP | 62107810 A | 5/1987 |
| JP | 03 200534 | 9/1991 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| WO | WO96/01736 | 1/1996 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |
| WO | WO03/020515 | 3/2003 |
| WO | WO 2006/053885 | 5/2006 |
| WO | WO2006/075141 | 7/2006 |
| WO | WO2006/102152 | 9/2006 |
| WO | WO2007/053603 | 5/2007 |
| WO | WO2008/091321 | 7/2008 |
| WO | WO2008/118554 | 10/2008 |

OTHER PUBLICATIONS

Annonymous, "Some benefits from the use of metallocene ethylene polymers in blown and cast films," Research Disclosure, Mason Publications, Hampshire, GB. vol. 392, No. 54 (1996).
ASTM D 882-09. Standard Test Method for Tensile Properties of Thin Plastic Sheeting. American National Standards Institute. Jan. 2009. www.astm.org.
ASTM D 1003-07 "Haze and Luminous Transmittance of Transparent Plastics," ASTM International. pp. 1-7.
ASTM D 1525-07 "Vicat Softening Temperature of Plastics," ASTM International. pp. 1-9.
ASTM D 2732-03 "Unrestrained Linear Thermal Shrinkage of Plastic Film and Sheeting," ASTM International. pp. 1-5.
ASTM D 3418-08. Standard Test Method for Transition Temperatures and Enthalpies of Fusion and Crystallization of Polymers by Differential Scanning Calorimetry. American National Standards Institute. Dec. 2008. www.astm.org.
ASTM D 3985. Standard Test Method for Oxygen Gas Transmission Rate Through Plastic Film and Sheeting Using a Coulometric Sensor. American National Standards Institute. pp. 1-7. www.astm.org.
ASTM F 1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org.
BS 2782-0:2004 "Methods of Testing Plastics," British Standards Institution. pp. 1-29 (2004).
English abstract of JP 2005-103902, USUI, Apr. 2005.
European Search Report corresponding to European Patent Application No. 08173056.6-2109 dated Mar. 16, 2009.
European Search Report corresponding to European Patent Application No. 08173057.4-2307 dated Sep. 22, 2009.
Extended European Search Report corresponding to European Patent Application No. 05021541.7-2115 dated Dec. 2, 2005.
Extended European Search Report corresponding to European Patent Application No. 08154742.4-2124 dated Jul. 2, 2009.
Extended European Search Report corresponding to European Patent Application No. 08156814 dated Oct. 9, 2008.
Extended European Search report corresponding to European Patent Application No. 09151289.7-2124 dated Jun. 8, 2009.
Interview Summary corresponding to U.S. Appl. No. 12/150,261 dated Dec. 28, 2010.
Machine Translation of JP 2005-103902, USUI, Apr. 2005.
Official Action corresponding to U.S. Appl. No. 11/528,741 dated Mar. 30, 2010.
Official Action corresponding to U.S. Appl. No. 11/528,741 dated Jan. 4, 2011.
Official Action corresponding to U.S. Appl. No. 11/528,741 dated May 18, 2011.
Official Action corresponding to U.S. Appl. No. 11/801,609 dated Sep. 15, 2009.
Official Action corresponding to U.S. Appl. No. 11/801,609 dated Feb. 5, 2010.
Official Action corresponding to U.S. Appl. No. 11/801,609 dated Jul. 15, 2010.

(56) References Cited

OTHER PUBLICATIONS

Official Action corresponding to U.S. Appl. No. 11/801,609 dated Jun. 20, 2011.
Official Action corresponding to U.S. Appl. No. 12/150,261 dated Oct. 27, 2009.
Official Action corresponding to U.S. Appl. No. 12/150,261 dated Jul. 7, 2010.
Official Action corresponding to U.S. Appl. No. 12/150,261 dated Mar. 22, 2011.
Official Action corresponding to U.S. Appl. No. 12/154,662 dated Mar. 29, 2011.
Official Action corresponding to U.S. Appl. No. 12/319,149 dated Oct. 15, 2009.
Official Action corresponding to U.S. Appl. No. 12/319,149 dated Jul. 7, 2010.
Official Action corresponding to U.S. Appl. No. 12/319,149 dated Mar. 22, 2011.
Official Action corresponding to U.S. Appl. No. 12/319,150 dated Oct. 15, 2010.
Official Action corresponding to U.S. Appl. No. 12/319,150 dated Apr. 26, 2011.
Official Action corresponding to U.S. Appl. No. 12/322,347 dated. Sep. 14, 2010.
Official Action corresponding to U.S. Appl. No. 12/322,347 dated Mar. 16, 2011.
Official Action corresponding to U.S. Appl. No. 12/508,233 dated Mar. 9, 2011.
"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
"DuPont™ Elvax® 3170," DuPont Packaging & Industrial Polymers. 3 pages (2004) http://web.archive.org/web/20060516114601/http://www2.dupont.com/Elvax/en_US/assets/downloads/vax3170.pdf.
"Polymer Blend," IUPAC Compendium of Chemical Terminology. 2$^{nd}$ Edition (1997).
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 12/150,261 dated Sep. 21, 2011.
Interview Summary corresponding to U.S. Appl. No. 12/319,149 dated Oct. 17, 2011.
Interview Summary corresponding to U.S. Appl. No. 12/319,150 dated Sep. 23, 2011.
Interview Summary corresponding to U.S. Appl. No. 12/322,347 dated Sep. 21, 2011.
Kipp, "Plastic Material Data Sheets," MatWeb (2004) (5 pages).
Notice of Allowance corresponding to U.S. Appl. No. 11/528,741 dated Oct. 28, 2011.
Official Action corresponding to U.S. Appl. No. 11/801,609 dated Jan. 30, 2012.
Official Action corresponding to U.S. Appl. No. 12/150,261 dated Jan. 31, 2012.
Official Action corresponding to U.S. Appl. No. 12/154,662 dated Aug. 18, 2011.
Official Action corresponding to U.S. Appl. No. 12/154,662 dated Jan. 18, 2012.
Official Action corresponding to U.S. Appl. No. 12/319,149 dated Dec. 2, 2011.
Official Action corresponding to U.S. Appl. No. 12/319,150 dated Nov. 4, 2011.
Official Action corresponding to U.S. Appl. No. 12/322,347 dated Oct. 26, 2011.
Official Action corresponding to U.S. Appl. No. 12/426,496 dated Feb. 7, 2012.
Official Action corresponding to U.S. Appl. No. 12/508,233 dated Nov. 23, 2011.
Official Action corresponding to U.S. Appl. No. 12/512,361 dated Aug. 31, 2011.
Official Action corresponding to U.S. Appl. No. 12/957,947 dated Jan. 17, 2012.
Petrie, "Handbook of Adhesives and Sealants," 2$^{nd}$ Edition. McGraw-Hill: New York, New York. pp. 465-466 (2007).
Unisource—Moisture Barrier & Oxygen Barrier Transmission Rates; <http://www.unisourcelink.com/packaging/pdf/MoistureBarrier.pdf> (Retrieved on Jan. 10, 2012).
"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.
"Polybutylene terephthalate (PBT)," 1 page <http://www.britannica.com/EBchecked/topic/468341/polybutylene-terephthalate-PBT> (Accessed on Jun. 13, 2012).
Extended European Search Report corresponding to European Patent Application No. 10193414.9-1217 dated May 9, 2011.
Interview Summary corresponding to U.S. Appl. No. 11/801,609 dated Jul. 31, 2012.
Interview Summary corresponding to U.S. Appl. No. 12/150,261 dated Jun. 12, 2012.
Interview Summary corresponding to U.S. Appl. No. 12/319,149 dated Jun. 15, 2012.
Interview Summary corresponding to U.S. Appl. No. 12/508,233 dated Apr. 26, 2012.
Official Action corresponding to U.S. Appl. No. 12/319,149 dated Aug. 27, 2012.
Official Action corresponding to U.S. Appl. No. 12/322,347 dated May 15, 2012.
Official Action corresponding to U.S. Appl. No. 12/508,233 dated Jun. 6, 2012.
Official Action corresponding to U.S. Appl. No. 12/512,361 dated May 2, 2012.
Official Action corresponding to U.S. Appl. No. 12/957,947 dated Sep. 25, 2012.
Search Report corresponding to French Patent Application No. 1059997 dated Jan. 16, 2012.
Interview Summary corresponding to U.S. Appl. No. 12/319,150 dated Sep. 6, 2013.
Official Action corresponding to U.S. Appl. No. 12/957,947 dated Jul. 24, 2013.

* cited by examiner

STACK SEALABLE HEAT SHRINKABLE FILM

CROSS-REFERENCE TO RELATED APPLICATIONS

This application claims the benefit of European Application No. 07107035.3, filed Apr. 26, 2007, the disclosure of which is herein incorporated by reference.

The present invention refers to a multilayer heat shrinkable film characterized by a combination of desirable properties, such as high shrinkage, good optical properties, excellent sealability and stack sealability. The invention further is directed to a method of producing a packaged food item by using said film. The invention is further directed to the use of said film or bags and pouches made therefrom for packaging goods as for example food products.

Generally, the packaging of food items by means of a heat shrinkable bag comprises the following steps
1. Putting the food item inside the bag and removing the air (vacuumizing) with the help of a vacuum device.
2. Sealing of the open end of the bag.
3. Placing the vacuum pack in a heat shrinking media such as hot water under a temperature that ensures the shrink of the pack (eg 90° C.).
4. The pack is ready and is characterized by appealing appearance and long shelf life because of the absence of oxygen.

These films need high shrink properties and good optics to ensure an excellent appearance and excellent sealability so that there is no entrance of oxygen to the pack as this would be detrimental for the shelf life of the food.

In some cases, where the food is stored in frozen conditions for example, there is the possibility to use a non gas barrier film. The other characteristics remain the same.

Packaging films with the above properties are well known in the art.

A problem that is often found in the art is that during the packaging process the operators must put the food in the bags with extra care, as they must avoid the overlapping of the bags. When overlapped or semi overlapped packs are vacuumized and sealed, the outer surfaces of the two (or more) bags seal the one to the other under the temperature and pressure conditions used to guarantee the sealability of the inner surfaces. This may lead to high rejects and loss of productivity. This situation in particular occurs in stack sealing procedures, i.e. in a situation, wherein two or more products are situated one upon the other and then are sealed.

If the operator tries to modify the temperature, seal time, pressure conditions there is a high possibility that the inner surfaces do not seal sufficiently.

Using bags that can be heat sealed when overlapping occurs, without problems of insufficient seal strength and sealing of the outer surfaces could lead to higher productivity, smaller cycle of each packed product and less attention required by the operator.

The problem to be solved has been addressed in the past:
EP 1131205 refers to the use of a high melting point polyamide in the outer layer. The use of this material has the disadvantage that it reduces the shrinkage of the final film because of the high vicat of this resin. Therefore, this approach is not suitable for heat-shrinkable films and products made thereof.

EP0810087 also suggests the use of polyester, polyamide and EVOH materials in coextrusion.

EP 1060077 refers to the use of a polyester material in the outside layer and a polyamide in a core layer. This material also has a high vicat and reduces the shrinkage of the multilayer product.

EP 1415930 A1 refers to the use of peelable combinations comprising polybutylene in the outer layer. The problem in this case is that there is a high risk of deteriorating the optical properties as the outer layer (which contributes a lot to the optical properties of the combination) consists of the blend of two incompatible polymers able to make a cohesive peel. The outer layer should comprise an easily peelable combination so that stack sealability is easily achieved. The peelable composition is applied by "extrusion, co-extrusion or coating of a substrate".

SUMMARY OF THE INVENTION

Therefore, the problem underlying the invention is to provide a heat sealable film, which can be advantageously be used in stack sealing applications. It is a further problem of the invention to avoid that the outer surfaces of the two (or more) bags in stack sealing applications seal the one to the other under the temperature and pressure conditions used to guarantee the sealability of the inner surfaces. It is a still further problem to provide bags that can be heat sealed when overlapping occurs, without problems of insufficient seal strength and sealing of the outer surfaces. It is an additional problem to provide a film for stack sealing applications which has excellent optical properties and high heat shrinkability. It is still a further problem to avoid the use of polyamide resin in the structure because of the following disadvantages:
1. Polyamide has no dimensional stability in conditions of high humidity. This means that it may potentially create problems to stabilize the length and width of bags exposed to the atmosphere.
2. Shrinkability of polyamide is low.

These problems are overcome by the subject-matter of the independent claims. Preferred embodiments are set forth in the dependent claims.

The inventors have managed to overcome all of these problems by discovering a film combining
1. Excellent overlapping sealability
2. Excellent sealing properties over a big range of machine conditions.
3. Excellent optical properties
4. Manufacturing in a stable and controlled way.
5. High heat shrinkability This is achieved by a heat shrinkable film which incorporates an outer layer from polyester elastomer and a core layer comprising EVOH and/or PVDC.

DEFINITIONS

In this application the following definitions are used:

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "core layer" refers to all film layers that exist between the outer and inner film layers.

The phrase "adjacent layer" refers to a layer which is to bond the outer layer to the core barrier layer. The adjacent layer preferably comprises maleic anhydrite modified polyolefin or other polyolefinic tie layer.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalysed polymers and polyethylene plastomers and elastomers.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%.

As used herein the phrase "ethylene vinyl acetate copolymer" refer to copolymers of ethylene and vinyl acetate.

As used herein, the term EVOH refers to saponified products of ethylene vinyl ester copolymers. The ethylene content is typically in the range of 25 to 50%.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates. Usually the PVDC copolymer may comprise heat stabilizers and plasticizers as is well known in the art.

As used herein the term polyamide refers to homopolymers and copolymers.

As used herein the term "polyester elastomer" refers to block copolymers where hard and soft blocks exist in the chain of the polymer. Examples of this kind of polymers are polyester ether and polyester ester copolymers, such as ARNITEL® from DSM, HYTREL® from Dupont and RITEFLEX® from TICONA.

All measurement methods mentioned herein are readily available for the skilled person. For example, they can be obtained from the American National Standards Institute at: www.webstore.ansi.org

DETAILED DESCRIPTION OF THE INVENTION

According to a first aspect the present invention is directed to a heat shrinkable film having a shrinkage of at least 10% measured according to ASTM 2732 in water at 90° C. in at least one of MD, TD directions, where the film comprises an outer layer of comprising polyester elastomer and a core layer comprising EVOH and/or PVDC.

A preferable resin for the outer layer according to the invention is a polyester elastomer, preferably a polyester ether elastomer. The melting point of this material is preferably 190° C. to 220° C. A blend of this polymer with a non elastomeric copolyester (eg polybutylene terephthalate) is also beneficial.

The adjacent layer comprises preferably maleic anhydrite modified polyolefin or other polyolefinic tie layer. The purpose of this layer is to bond the outer layer to the core barrier layer.

The adjacent layer comprises an oxygen barrier material selected from EVOH and PVDC. PVDC is preferable for higher shrinkability.

In the case of EVOH, a minor proportion of special polyamide can be used to increase the flexibility of EVOH.

Between the sealing layer and the oxygen barrier layer, a tie layer could be used. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL from Dupont and ADMER from Mitsui.

The inner heat sealing layer of the film may comprise ethylene alpha olefin copolymers and/or ethylene propylene copolymers or terpolymers. Typical examples are the homogeneous polymers AFFINITY® (DOW), EXACT® (EXXON), TAFMER® (MITSUI), Ethylene vinyl acetate copolymers and other well known in the art sealing layer polymers.

Between the outer and the barrier layer there may be another layer incorporating a tie layer. Preferred materials for this tie layer may be ethylene ester copolymers, such as ethylene vinyl acetate copolymers, ethylene methyl acrylate copolymers and other materials well known in the art. A preferred version might include maleic anhydrite modified ethylene ester copolymers or maleic anhydrite modified LLDPE. Commercial trademarks are for example BYNEL from Dupont and ADMER from Mitsui.

Any of the layers described above may also include additives well known in the art such as slip agents, antiblock, polymer processing aids, antistatic, antifog, acid scavengers, odour scavengers and the like. A person skilled in the art may select the right additives according to any particular needs.

In a preferred embodiment, the heat shrinkable film is irradiated after the extrusion. E beam is a recommendable process to crosslink the structure and increase mechanical properties.

In a further aspect, the invention is directed to the use of the films or the bag or pouch of the invention for packaging food and a method for packaging a food item. For example, the food item is putted inside the bag and the air is removed (vacuumising) with the help of a vacuum device. Subsequently, the open end of the bag is sealed and the vacuum pack is placed in a heat shrinking media such as hot water under a temperature that ensures the shrink of the pack (eg 90° C.). The pack than is ready and is characterized by appealing appearance and long shelf life because of the absence of oxygen.

The present invention is now described by the following Examples:

EXAMPLE 1

A 5 layer film is produced in a double bubble commercial line with the following recipe Inner (sealing layer), 32% P1+30% P2+20% E1+10% E2+8% ADDITIVES The percentage is in wt % unless otherwise indicated.

| Adjacent layer | D1 |
| Barrier layer | PVDC commercial grade |
| Adjacent layer | D2 |
| Outer layer | PEE1 |

See table 1

The thickness of the structure is 26/7/7/7/8 starting from the inner and going to the outer layer.

EXAMPLE 2

A 5 layer film is produced in a double bubble commercial line with the following recipe Inner (sealing layer), 32% P1+30% P2+20% E1+10% E2+8% ADDITIVES

| Adjacent layer | D1 |
| Barrier layer | EVOH 44% ethylene content |
| Adjacent layer | D2 |
| Outer layer | PEE1 |

See table 1

The thickness of the structure is 26/7/7/7/8 starting from the inner and going to the outer layer.

TABLE 1

| Type | Description | Manufacturer | Melt Index g/10 min | Density g/cm$^3$ | Melting point °C. |
|---|---|---|---|---|---|
| E1 | EVA | Dupont 3135 X | 0.35 | 0.93 | 95 |
| E2 | EVA | 1005 VN2 | 0.40 | 0.928 | 102 |
| D1 | MODIFIED LLDPE | MITSUI ADMER 518 | 3 | 0.91 | |
| P1 | Plastomer | Dow Affinity VP 8770 | 1.0 | 0.885 | 74 |
| PEE1 | POLYESTER ELASTOMER | ARNITEL EM 630 | 7 at 230 C. | 1.25 | 213 |
| D2 | EVA MODIFIED | BYNEL 3861 | | | |
| P2 | PLASTOMER | DOW AFFINITY PL 1880 | 1.0 | 0.902 | 100 |

Tests

1. Haze measurement. The haze measurement was done according to ASTM D 1003.
2. Gloss measurement. This was done according to BS 2782.
3. Shrinkage measurement done according to ASTM 2732.
4. Sealing window.

This final test was done on a Bosch vacuum sealing machine. We put one piece of the tube of each material on another so that there is an overlap area. We seal this area and then we pull. The material is thought to be OK if the outer surfaces are easily pulled without any delamination or resistance and the inner (sealing layers) are at the same time strongly sealed. Different sealing times were applied in order to see which of the three materials has a more extended operating window.

The results are displayed on table 2

TABLE 2

| | HAZE | GLOSS | SHRINKAGE (MD/TD) | STACK SEAL WINDOW (sealing times) |
|---|---|---|---|---|
| Material 1 | 6 | 93 | 52/40 | 4-10 |
| Material 2 | 7 | 98 | 42/41 | 4-10 |
| Comparison | 10 | 95 | 35/42 | 4-10 |

So, the materials have the same stack sealable operating window and they combine much improved shrinkage properties as well as excellent optics in the case of material 1, 2.

The invention claimed is:

1. A heat shrinkable film having a shrinkage of at least 10% measured according to ASTM 2732 in water at 90° C. in at least one of the longitudinal and transverse directions, where the film comprises (a) an outer layer consisting of a polyester elastomer or a blend of a polyester elastomer and a non elastomeric copolyester, wherein a resin for the polyester elastomer is a polyester ether elastomer, and (b) a core layer consisting of polyvinylidene chloride (PVDC).

2. The film of claim 1, wherein the melting point of the resin is 190° C. to 220° C.

3. The film of claim 1, wherein the film further comprises an adjacent layer between the outer layer and the core layer.

4. The film of claim 1, wherein the heat shrinkable film is irradiated after extrusion.

5. A bag or pouch comprising a film according to claim 1.

6. A method for producing a packaged food item comprising the steps of:
 a) providing a bag or pouch of claim 5,
 b) putting a food item inside the bag or pouch;
 c) removing the air (vacuumising) of the bag or pouch;
 d) sealing the open end of the bag or pouch; and
 e) placing the vacuum pack in a heat shrinking media.

7. The method of claim 6, wherein the heat shrinking media is hot water at a temperature that ensures the shrink of the pack.

* * * * *